F. P. WOODWARD.
RESILIENT INNER TUBE FOR VEHICLE TIRES.
APPLICATION FILED FEB. 21, 1919.

1,346,290.  Patented July 13, 1920.

Inventor:
Frederick P. Woodward,
By his attorney,
Charles L. Goodwin.

UNITED STATES PATENT OFFICE.

FREDERICK P. WOODWARD, OF TOPSFIELD, MASSACHUSETTS, ASSIGNOR OF ONE-HALF TO ESTHER A. WOODWARD, OF BOSTON, MASSACHUSETTS.

RESILIENT INNER TUBE FOR VEHICLE-TIRES.

1,346,290.   Specification of Letters Patent.   Patented July 13, 1920.

Application filed February 21, 1919. Serial No. 278,505.

*To all whom it may concern:*

Be it known that I, FREDERICK P. WOODWARD, a citizen of the United States, residing at Topsfield, in the county of Essex and State of Massachusetts, have invented new and useful Improvements in Resilient Inner Tubes for Vehicle-Tires, of which the following is a specification.

This invention relates to inner tubes for vehicle tires.

The object of the invention is to provide an inner tube for a vehicle tire which shall be resilient but which shall be puncture proof.

The inner tube of this invention is adapted to be used in place of the pneumatic inner tube now used inside the rubber shoe of pneumatic tires for vehicles. It is well known that the inner tube of pneumatic tires is liable to be punctured and when so punctured the tire becomes flat, this results in a great amount of trouble and work to take off the outer shoe and replace or repair the pneumatic inner tube. It is the object of this invention to overcome these difficulties by providing an inner tube which shall be resilient and non-puncturable.

The invention consists in the combination and arrangement of parts set forth in the following specification and particularly pointed out in the claims thereof.

Referring to the drawings.

Like numerals refer to like parts throughout the several views of the drawings.

Figure 1:
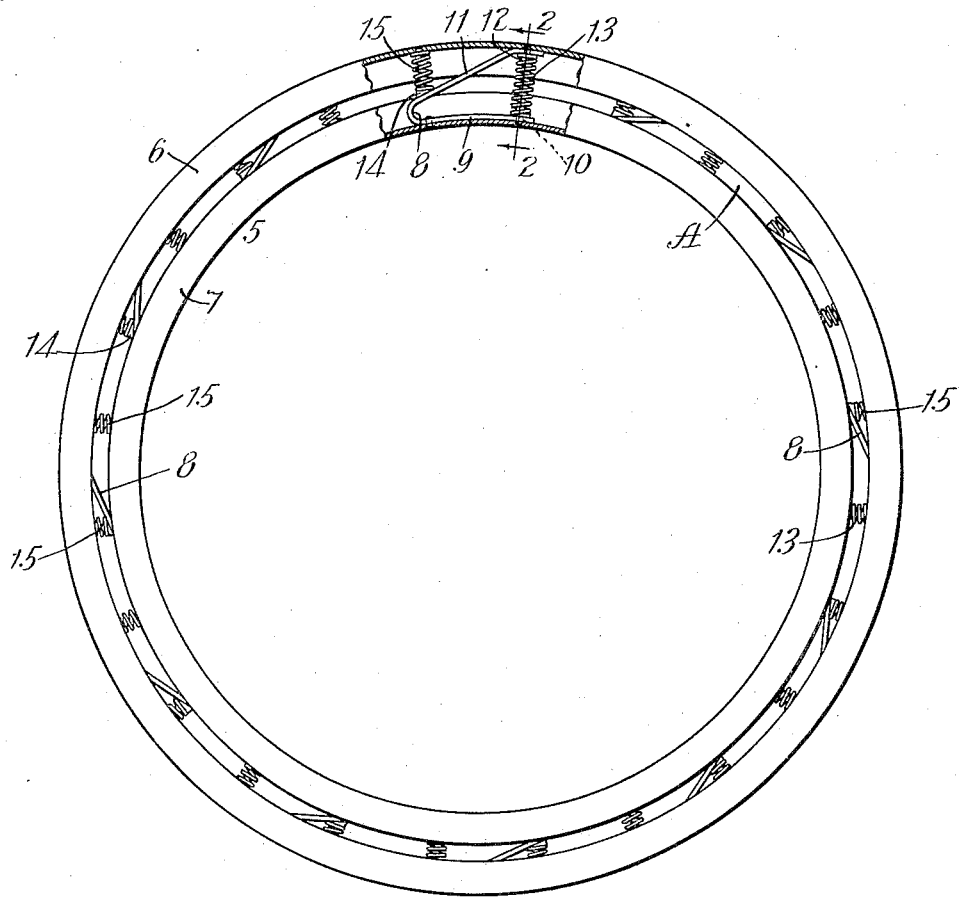
Figure 1 is a side elevation of an inner tube constructed in accordance with my invention the same being partly broken away and shown in section.
Figure 2:
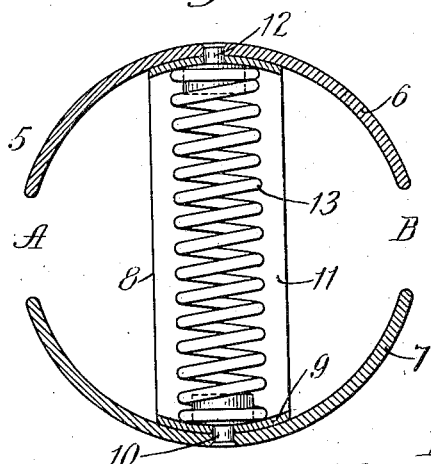
Fig. 2 is an enlarged sectional view taken on the line 2—2 of Fig. 1.

In the drawings 5 is a resilient inner tube constructed in accordance with my invention and consisting of an outer metal ring 6 convexo-concave in cross section as illustrated in Fig. 2, and an inner ring 7 concavo-convex in cross section as illustrated in Fig. 2. Said rings 6 and 7 are separated at their adjacent edges by spaces A and B and are connected together by a series of V-shaped springs 8, each of the V-shaped springs 8 has a leg 9 which fits the inner surface of the ring 7 and is fastened thereto by a stud 10, the other leg 11 of said V-shaped spring is fastened to the outer ring 6 by a stud 12. A spiral spring 13 is interposed between the legs 9 and 11 of the V-shaped spring 8 and is held in position by the inwardly projecting ends of the studs 10 and 12. The leg 11 of the V-shaped spring 8 is provided on its outer surface with a boss 14, and a spiral spring 15 is interposed between the boss 14 and the outer ring 6.

It will be understood that the inner tube 5 is inserted within an outer shoe of rubber, the springs 8 being compressed sufficiently to allow the insertion of the inner tube into the shoe and when the inner tube is thus inserted in the outer shoe the appearance of the tire as a whole will be the same as an ordinary pneumatic tire and said tire will yield to render the riding of the vehicle upon which it is placed comfortable and easy. It will also be seen that in case of the puncture of the outer shoe by a nail or tack that the same will come to a stop when it encounters the outer ring 6 and there will be no flat tire resulting from the puncture of the shoe.

I claim:

1. An inner tube for vehicle tires having, in combination, an outer convexo-concave ring, an oppositely disposed inner concavo-convex ring and a plurality of V-shaped springs interposed between said rings, one leg of each of said V-shaped springs being fastened to the inner face of said outer ring and the other leg of each of said V-shaped springs being fastened to said inner ring, a spiral spring interposed between one leg of each of said V-shaped springs and said outer ring, and another spiral spring interposed between the legs of each of said V-shaped springs.

2. An inner tube for vehicle tires having, in combination, an outer convexo-concave ring, an oppositely disposed inner concavo-convex ring and a plurality of V-shaped springs interposed between said rings, one leg of each of said V-shaped springs being fastened to the inner face of said outer ring and the other leg of each of said V-shaped springs being fastened to said inner ring and a spiral spring interposed between one leg of each of said V-shaped springs and said outer ring.

In testimony whereof I have hereunto set my hand in presence of two subscribing witnesses.

FREDERICK P. WOODWARD.

Witnesses:
WILLIAM B. POOR,
KATHERINE D. POOR.